United States Patent Office 3,717,415
Patented Feb. 20, 1973

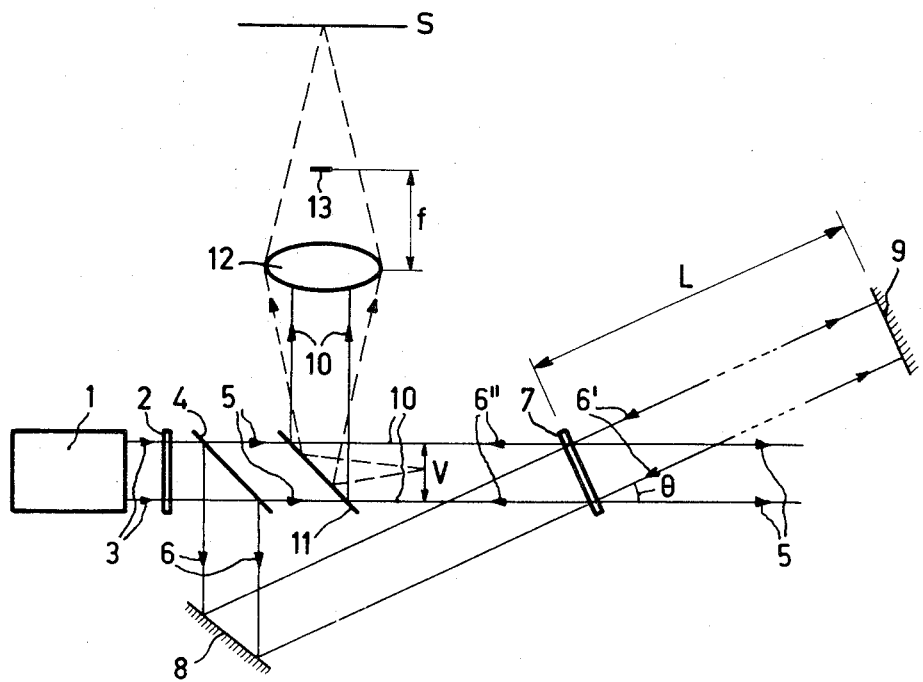

3,717,415
SHORT INTERVAL HOLOGRAPHIC COMPARISON
Johannes Petrus Woerdman, Emmasingel, Eindhoven, Netherlands, assignor to U.S. Philips Corporation, New York, N.Y.
Filed July 12, 1971, Ser. No. 161,564
Claims priority, application Netherlands, July 14, 1970, 7010378
Int. Cl. G01b 11/24; G02b 27/00
U.S. Cl. 356—168                                5 Claims

ABSTRACT OF THE DISCLOSURE

A method of, and an apparatus for, holographic comparison are described in which at a first instant a hologram of an object is made, this hologram is so reconstructed at a second instant that an image of the object is formed at the original position of the object and the image is compared with the object itself at the second instant. It is shown that by the direct production of the hologram by means of optical changes in a non-linear optical medium and by reconstructing this hologram a very short time afterwards the object may be compared with itself at two closely proximate instants.

---

The invention relates to a method of holographic comparison in which a hologram of an object is made at a first instant, this hologram is so reconstructed at a second instant that an image of the object is formed at the original position of the object and the image is compared with the object itself at the second instant. The invention also relates to apparatus for carrying out this method.

Such a method is described in the paper "Theory of Holographic Interferometry" in "The Journal of the Acoustical Society of America" 45, No. 5, 1969, pp. 1178 and 1179. In the method described in this paper a hologram is made in a photographic emulsion. A reconstruction of the halogram can only be made after the photographic emulsion has been developed.

Apart from the time of development, which is about 10 seconds, some time is required to remove the hologram from its arrangement and to replace it in its initial position after it has been developed. Hence, the known method only permits observation of the change in an object over a comparatively long period of time. In addition, the developed hologram plate must be exactly replaced in the initial position, which requires a high degree of accuracy.

It is an object of the invention to provide a method of comparing an object with itself at two closely proximate instants. The method according to the invention is accordingly characterized in that the hologram is made directly by optical changes in a non-linear optical medium and is reconstructed after a very short time interval. The method according to the invention is based on the recognition that non-linear optical materials, such as photochromatic materials and semiconductor materials, are eminently suitable for rapid storage of holograms. The interference pattern formed by the cooperating object and reference beams produces a spatial modulation of the absorption index or the refractive index in the said materials. The absorption index $k$ is given by the formula $$\kappa = \frac{\alpha \lambda}{4\pi}$$

where $\alpha$ is the absorption coefficient and $\lambda$ is the wavelength of the radiation used. The spatial modulation of the indices persists for some time after the interfering beams have disappeared. The hologram is immediately available without the need for previous development and may be reconstructed at once. In addition, this hologram automatically is in the correct position.

In the method according to the invention, preferably a phase hologram is produced by providing a spatial modulation of the refractive index in a semiconductor material. In theory the diffraction efficiency of a phase hologram is greater than that of a volume hologram. The hologram produced in a semiconductor material has a very short lifetime, which enables holograms to be recorded and reconstructed in rapid succession.

According to a further feature of the method according to the invention the hologram is recorded in silicon and produced and reconstructed by means of infrared radiation. It should be noted that it is known from "Physics Letters," vol. 30A, No. 3, pages 164–165 to use silicon as a medium for recording the pattern of two interfering beams. However, in the experiment described the possibility of rapidly recording an interference pattern is not utilized.

An apparatus for carrying out the method according to the invention, which apparatus comprises a source of coherent radiation and a slice of a material suitable for recording a hologram, is characterized in that the source of coherent radiation is a laser source which emits radiation in the form of pulses of very short duration.

According to a further feature, in the apparatus according to the invention a reflecting element is inserted in the path of the radiation beam which during the recording of the hologram serves as a reference beam at that side of the hologram slice which is more remote from the object. The hologram is reconstructed at the initial position of the object by the reflected reference beam.

The position of the reflecting element preferably is adjustable. This facilitates adjusting the delay time for the reconstruction of the hologram.

An embodiment of the invention will now be described, by way of example, with reference to the accompanying diagrammatic drawing, the single figure of which shows an apparatus for carrying out the method according to the invention.

A beam of radiation 3 which is emitted by a laser source 1 and passes through a λ/4 plate 2 is divided by a beam-splitting mirror 4 into an object beam 5 and a reference beam 6. A phase object V is inserted in the path of the beam 5. This object may, for example, be a plasma in which rapid variations occur or an object the outline of which rapidly varies. It may alternatively be an object which is rotated about an axis or an object which suffers a displacement in a direction at righ angles to the direction of the beam 5. The beam of radiation which passes through the object V is intercepted by a slice of silicon 7. The reference beam is reflected by a mirror 8 and also is incident on the silicon slice. An interference pattern is produced at the slice.

The laser source 1 emits radiation of a wavelength such that the energy of the radiation quanta ($h\nu$) is slightly greater than the enrgy required to transfer electrons in the silicon from the valence band to the conduction band. For this purpose a Nd-laser is used. Thus, the energy of the radiation quanta $h\nu$ is 1.17 ev. whilst the band gap of silicon is 1.11 ev. at 300° K. The radiation incident on the silicon generates hole-electron pairs.

The optical interference pattern is converted into a corresponding spatial pattern of holes and electrons. Owing to the dispersion of the free charge carriers, the refractive index of the silicon slice will be spatially modulated in accordance with the interference pattern. A laser beam transmitted through hte silicon plate will be deflected, producing a virtual and a real image of the object.

After the reference beam 6 has passed through the silicon slice 7, it is reflected by a mirror 9 so as to retraverse the silicon slice. In this second passage the refracted beam 6' is partially deflected. The deflected subbeam 6" has the same direction as has the object beam 5. The hologram recorded in the silicon slice is reconstructed at the original position of the object V.

The laser source 1 emits radiation pulses of very short duration (for example 10 ns.). If at the instant $t=t_0$ a pulse is emitted, the instantaneous state of the object is holographically recorded in the silicon slice. The radiation pulse of the reference beam 6 propagates through a distance L beyond the silicon slice and then is reflected. After the pulse of the reflected reference beam 6' has travelled a distance L, the hologram is reconstructed. Thus the reconstruction of the hologram takes place $2L/c$ seconds after the hologram has been made. In this expression $c$ is the velocity of propagation of the radiation used. In this manner the transmission T of a point $x$ of the object at the instant $$t=t_0+\frac{2L}{c} \text{ or } T\left(x, t_0+\frac{2L}{c}\right)$$

is compared with the transmission at the instant $t=t_0$ or $T(x, t_0)$.

Displacing the mirror 9 relative to the silicon slice enables the time $2L/c$ to be varied. However, the duration of the laser pulses must always be much shorter than the delay time $2L/c$. The distance L is large compared with the other distances in the apparatus, such as the distance between the laser source and the silicon slice.

If the object V has not changed in the time interval $2L/c$, the wave front of the beam 6" which reconstructs the object is converted by diffraction at the object into a plane parallel beam 10. However, if the object has changed in the time interval $2L/c$, the beam 10 emerging from the object is a modified plane beam which may be considered to be produced by causing a plane parallel beam to traverse the "difference object" $T(x, t_0)-T(x, t_0+2L/c)$. The beam 10 will then contain all the information about the changes which have occurred in the object in the time interval $2L/c$.

A half-silvered mirror 11 reflects the beam 10 to a lens 12, which forms an image of the "difference object" on a screen S. Known techniques may be used for the further processing of the phase-modulated beam. For example, an absorbing plate 13 may be disposed in the rear focal plane of the lens 12 to prevent zero-order deflection radiation to fall on the screen S. By positioning the screen S at some distance from the image forming plane of the lens, the phase modulation may be converted into an amplitude modulation.

The λ/4 plate 2 is provided to prevent reflected radiation from re-entering the laser cavity and being amplified therein. The plane-polarized radiation emitted by the laser source 1 is converted into circularly polarized radiation by the λ/4 plate. The radiation of the reflected reference beam 6' which is not deflected in the direction of the object beam by the silicon slice and may find its way onto the λ/4 plate, is circularly polarized and is converted into plane polarized radiation by the λ/4 plate. Owing to the reflection the latter radiation has experienced, its plane of polarization is at right angles to the plane of polarization of the radiation emitted by the laser source. The laser cavity includes a linear polarizer which prevents amplification of the deflected radiation.

Instead of the plane mirror, another reflecting element, such as a corner cube reflector, may be used.

Instead of silicon other semiconductor materials in which a change in the refractive index may be produced by generation of holes and electrons may be used as holographic materials. In each case a suitable laser source must be chosen so that the band gap energy of the respective material is slightly smaller than the energy of the radiation quanta of the laser source used.

A special feature of silicon when used as a holographic medium is that it permits the use of infrared radiation. The use of infrared radiation may be of advantage under certain circumstances. For example, when a discharge takes place in air, ultraviolet radiation is emitted. When the system Nd laser+silicon is used for investigating these discharges, any ultraviolet radiation which may strike the silicon is absorbed in a thin surface layer of the silicon. The hologram is not influenced by this ultraviolet radiation.

The method according to the invention is not restricted to the use of semiconductor materials but it may also be carried out with the use of photochromatic materials, such, for example, as described in "Applied Optics," volume 8, 1969, pages 2473–2477. Visible radiation incident on these materials changes their absorption coefficients. Consequently, the recorded holograms will be amplitude holograms, whereas the holograms recorded in silicon are phase holograms. Holograms recorded in photochromatic materials have a much longer life than have holograms recorded in semiconductor materials. For example, the life of a hologram in $SrTiO_3$ is of the order of a minute, whereas the life in silicon is about 30 ns.

Owing to the short life of a hologram in silicon it is possible in principle to produce differential images at a high repetition frequency (for example every 100 ns.).

In an experimental set-up a Q-switched Nd:YAG laser having a peak power of 6 mvv. and a pulse length of 7 ns. was used. The power incident on the silicon slice was about 1 mw./cm.$^2$. The silicon slice was 1.7 mm. thick. The angle $\Theta$ (see the figure) was $3.4 \cdot 10^{-2}$ radians. The resolution in the silicon was 320 lines/cm. The lifetime of the hologram was 33 ns.

What is claimed is:

1. A method of holographic comparison comprising the steps of; dividing a pulse of coherent radiation into an object beam and a reference beam, exposing an object to the object beam whereby the object alters the radiation impinging thereon, concurrently illuminating a radiation transmitting non-linear holographic recording medium with both the altered radiaton from the object and with the reference beam, the reference beam passing through the recording medium, retroreflecting the reference beam back through the recording medium from a distance sufficiently remote from the recording medium to insure that the impinging retroreflected reference beam arrives at the recording medium after the pulsed altered radiation from the object has ceased, the nonlinear holographic recording medium having a sufficiently rapid self-developing period that the retroreflected reference beam arrives after the hologram is recorded, the retroreflected reference beam thereby reconstructing an image of the object on the object, and thereafter focusing the object modulated image light so as to provide an indication of the difference between said image and said object.

2. A method as claimed in claim 1, characterized in that a phase hologram is produced by providing a spatial modulation of the refractive index in a semiconductor material.

3. A method as claimed in claim 2, characterized in that the hologram is recorded in silicon and is produced and reconstructed by means of infrared radiation.

4. Apparatus for holographic comparison of an object, comprising a source of pulsed coherent radiation, means for dividing the pulse of radiation from the source into a reference beam and an object beam, the object being positioned in the object beam and thereby altering the radiation of the object beam, a radiation transmitting non-linear holographic recording medium in the path of the altered object beam and reference beam whereby an interference pattern is formed on the holographic recording medium, a retroreflector in the path of the reference beam remote from the recording medium and positioned to reflect the reference beam passing through the recording medium back along the same path to the recording medium, the distance between the recording medium and the retroreflector being greater than that necessary to insure that the interval between the time when the reference beam first impinges on the recording medium and the time that the retroreflected reference beam impinges on the recording medium is equal to the pulse duration of the coherent radiation, the self-developing time of the non-linear recording medium being less than said interval, whereby the retroreflected reference beam reconstructs an image of the object on the object, and means for focusing the object modulated image light so as to provide an indication of the difference between said image and said object.

5. Apparatus as claimed in claim 4, characterized in that the position of the reflecting element is adjustable.

References Cited

UNITED STATES PATENTS

| 3,531,589 | 9/1970 | Collier et al. | 350—3.5 |
| 3,542,452 | 11/1970 | Gerritsen | 350—3.5 |
| 3,444,316 | 5/1969 | Gerritsen | 350—3.5 |

OTHER REFERENCES

Chau: Review of Scientific Instruments, vol. 39, No. 12, December 1968, pp. 1789–1792.

(L–7160 0031) Jahoda: Applied Physics Letters, vol. 14, No. 11, June 1969, pp. 341–343.

DAVID SCHONBERG, Primary Examiner

R. J. STERN, Assistant Examiner

U.S. Cl. X.R.

350—3.5; 356—109, 165